US012148102B2

(12) United States Patent
Palacios

(10) Patent No.: US 12,148,102 B2
(45) Date of Patent: Nov. 19, 2024

(54) DYNAMIC AUGMENTATION OF STIMULI BASED ON PROFILE OF USER

(71) Applicant: Sony Interactive Entertainment Inc., Tokyo (JP)

(72) Inventor: Jorge Arroyo Palacios, Livermore, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/411,989

(22) Filed: Aug. 25, 2021

(65) Prior Publication Data

US 2023/0063681 A1 Mar. 2, 2023

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0172* (2013.01); *G06F 18/214* (2023.01);
(Continued)

(58) Field of Classification Search
CPC ........ G06T 19/006; G06T 7/50; G06T 13/40; G06T 17/20; G06T 2207/10028;
(Continued)

(56) References Cited

U.S. PATENT DOCUMENTS 10,783,800 B1 * 9/2020 Dieker .................... G09B 9/00
2015/0099946 A1 * 4/2015 Sahin ...................... A61B 7/04
600/301
(Continued)

FOREIGN PATENT DOCUMENTS

CN 110070944 A * 7/2019 ............. G06F 3/011
CN 110931111 A * 3/2020
(Continued)

OTHER PUBLICATIONS

Lee, J. R. H., & Wong, A. (2020). AEGIS: A real-time multimodal augmented reality computer vision based system to assist facial expression recognition for individuals with autism spectrum disorder. arXiv preprint arXiv:2010.11884.*
(Continued)

*Primary Examiner* — Sarah Lhymn
(74) *Attorney, Agent, or Firm* — PENILLA IP, APC

(57) ABSTRACT

A method for augmenting a real-world scene viewed through augmented reality (AR) glasses includes determining that an overlay should be processed for a real-world person being viewed via the AR glasses, with the determining using artificial intelligence (AI) to identify a trigger scenario. The AI is configured to process a video stream of images captured of the real-world person using a camera of the AR glasses to identify the trigger scenario, which is associated with an intensity level exhibited by the real-world person. The method also includes identifying the overlay to replace a portion of the real-world person in the video stream of images, and generating an augmented video stream that includes the video stream composited with the overlay. The augmented video stream being presented via the AR glasses is configured to adjust the intensity level exhibited by the real-world person when viewed via the AR glasses.

6 Claims, 9 Drawing Sheets

(51) Int. Cl.
*G06F 18/214* (2023.01)
*G06T 7/50* (2017.01)
*G06T 13/40* (2011.01)
*G06T 17/20* (2006.01)
*G06V 20/10* (2022.01)
*G06V 40/10* (2022.01)
*G06V 40/16* (2022.01)
*G06V 40/20* (2022.01)

(52) U.S. Cl.
CPC ............. *G06T 7/50* (2017.01); *G06T 13/40* (2013.01); *G06T 17/20* (2013.01); *G06V 20/10* (2022.01); *G06V 40/168* (2022.01); *G06V 40/174* (2022.01); *G06V 40/20* (2022.01); *G02B 2027/0138* (2013.01); *G06T 2207/10028* (2013.01); *G06T 2207/30196* (2013.01)

(58) Field of Classification Search
CPC ...... G06T 2207/30196; G02B 27/0172; G02B 2027/0138; G06K 9/6256; G06V 20/10; G06V 40/10; G06V 40/168; G06V 40/174; G06V 40/20
See application file for complete search history.

(56) References Cited

U.S. PATENT DOCUMENTS

| | | | | |
|---|---|---|---|---|
| 2015/0223731 | A1* | 8/2015 | Sahin | A61B 5/16 600/595 |
| 2017/0206691 | A1* | 7/2017 | Harrises | G02B 27/0172 |
| 2017/0365101 | A1* | 12/2017 | Samec | G16H 50/20 |
| 2019/0035153 | A1* | 1/2019 | Dange | G06V 20/20 |
| 2019/0188895 | A1* | 6/2019 | Miller, IV | G06V 40/20 |
| 2019/0261908 | A1* | 8/2019 | Alailima | A61B 5/7405 |
| 2019/0265783 | A1* | 8/2019 | Wedig | G06V 20/20 |
| 2019/0266796 | A1* | 8/2019 | Comer | G06T 17/20 |
| 2019/0325633 | A1* | 10/2019 | Miller, IV | G06F 3/011 |
| 2019/0340803 | A1* | 11/2019 | Comer | G06T 13/40 |
| 2019/0362529 | A1* | 11/2019 | Wedig | G06T 13/40 |
| 2020/0005138 | A1* | 1/2020 | Wedig | G06V 40/28 |
| 2020/0060603 | A1* | 2/2020 | Bower | A61B 5/0533 |
| 2020/0174557 | A1* | 6/2020 | Alailima | G06F 9/542 |
| 2020/0218767 | A1* | 7/2020 | Ritchey | G06F 3/147 |
| 2020/0251211 | A1* | 8/2020 | Mckinney | G06F 3/011 |
| 2020/0286284 | A1* | 9/2020 | Grabli | G06T 13/40 |
| 2020/0286301 | A1* | 9/2020 | Loper | G06T 7/80 |
| 2020/0388065 | A1* | 12/2020 | Miller, IV | G06F 3/017 |
| 2020/0402643 | A1* | 12/2020 | Trees | G16H 10/20 |
| 2021/0104100 | A1* | 4/2021 | Whitney | G02B 27/0172 |
| 2021/0133509 | A1* | 5/2021 | Wall | A61B 5/7267 |
| 2021/0150731 | A1* | 5/2021 | Saquib | G06T 19/006 |
| 2021/0312684 | A1* | 10/2021 | Zimmermann | G06F 3/011 |
| 2021/0350604 | A1* | 11/2021 | Pejsa | G06T 19/006 |
| 2022/0057519 | A1* | 2/2022 | Goldstein | G01S 17/04 |
| 2022/0125337 | A1* | 4/2022 | Assouline | G06T 7/251 |
| 2022/0156999 | A1* | 5/2022 | Assouline | G06F 3/04817 |
| 2022/0157000 | A1* | 5/2022 | Assouline | G06T 13/40 |
| 2022/0157025 | A1* | 5/2022 | Assouline | G06T 13/40 |

FOREIGN PATENT DOCUMENTS

| | | | | |
|---|---|---|---|---|
| CN | 111081371 A | * | 4/2020 | |
| CN | 113658705 A | * | 11/2021 | |
| WO | WO-2016172557 A1 | * | 10/2016 | A61B 5/0022 |
| WO | WO-2018142228 A2 | * | 8/2018 | G06F 3/012 |
| WO | WO-2019161050 A1 | * | 8/2019 | G16H 20/17 |
| WO | WO-2019173189 A1 | * | 9/2019 | A16B 5/0002 |
| WO | WO-2020169011 A1 | * | 8/2020 | G06F 21/32 |

OTHER PUBLICATIONS

Laine, F., Rauzy, S., Tardif, C., & Gepner, B. (2011). Slowing down the presentation of facial and body movements enhances imitation performance in children with severe autism. Journal of autism and developmental disorders, 41, 983-996.*

Gepner, B., & Tardif, C. (2006). Autism, movement, time and thought. E-motion mis-sight and other temporo-spatial processing disorders in autism. Frontiers in Cognitive Psychology. New York: Nova Science Publishers, 1-30.*

* cited by examiner

DYNAMIC AUGMENTATION OF STIMULI BASED ON PROFILE OF USER

BACKGROUND

People with certain disabilities can have difficulty processing everyday sensory information. For example, some people with autism can be hyposensitive (underreact) to sensory input. Such hyposensitive people can miss subtle changes in the world around them, for example, changes in emotion of other people, softer sounds, etc. Other people with autism can be hypersensitive (overreact) to sensory input. Such hypersensitive people can be distracted or become extremely anxious or agitated when experiencing audio input such as a siren or the sound of a vacuum cleaner, or experiencing visual input such as the sight of a person dressed as a clown or a person frantically waving their arms around.

It is in this context that embodiments arise.

SUMMARY

In an example embodiment, a method for augmenting a real-world scene viewed through augmented reality (AR) glasses is provided. The method includes determining that an overlay should be processed for a real-world person being viewed via the augmented reality (AR) glasses, with the determining using artificial intelligence (AI) to identify a trigger scenario. The artificial intelligence (AI) is configured to process a video stream of images captured of the real-world person using a camera of the AR glasses to identify the trigger scenario, with the trigger scenario being associated with an intensity level exhibited by the real-world person. The method also includes identifying the overlay to replace a portion of the real-world person in the video stream of images, and generating an augmented video stream that includes the video stream composited with the overlay. The augmented video stream being presented via the AR glasses is configured to adjust the intensity level exhibited by the real-world person when viewed via the AR glasses.

In one embodiment, the overlay is defined as video content that is dynamically tracked and sized for placement over a portion of the real-world person in the video stream of images captured by the camera of the AR glasses, and the camera is a forward-facing camera with a field of view (FOV) that is directed away from a person wearing the AR glasses. In one embodiment, the processing by the AI uses a model, and the model is trained to identify settings updates for a profile of a user, and the profile of the user defines types of trigger scenarios that produce an intensity level that should be adjusted for the user.

In one embodiment, the types of trigger scenarios include a feature of a face of the real-world person, a feature of a body of the real-world person, or a combination of features of the face and the body of the real-world person, and the feature of the face, the feature of the body, or the combination of features of the face and body are processed by classifiers that are configured to identify the feature or features used by the AI either to use the model or to train the model.

In one embodiment, the method further includes receiving reaction data from the user of the AR glasses, with the reaction data being processed to identify additional types of trigger scenarios that produce the intensity level that should be adjusted for the user. The additional types of trigger scenarios can be types of trigger scenarios not included in an initial profile of the user, and the reaction data is associated with a feature of the face, a feature of the body, or a combination of features of the face and body and the feature or features are processed by the AI to continue to train the model for the user and to update the profile of the user with the additional types of trigger scenarios.

In one embodiment, the intensity level exhibited by the real-world person is calculated by a measured characteristic of a feature of the face, a measured characteristic of a feature of the body, or measured characteristics of a combination of features of the face and body of the real-world person, with the measured characteristic or measured characteristics including movement of a part of the face, movement of a part of the body, or a combination of movements of parts of the face and the body of the real-world person. The movement of the part of the face is associated with a template that defines an approximate feature position or an approximate feature movement that represents a facial expression.

In one embodiment, the overlay includes an audio component that is configured to mask a sound of the real-world person or the real-world scene as captured by a microphone of the AR glasses. In one embodiment, the AR glasses are part of a head-mounted display (HMD) having the camera mounted in a forward-facing configuration so that a field of view (FOV) of the camera is directed away from a user wearing the head-mounted display (HMD). In one embodiment, the AR glasses include lenses for rendering video images in select portions of the lenses and for providing see-through viewing through portions of the lenses other than the select portions.

In one embodiment, the portion of the real-world person is a body part, and the body part is associated with a rig of joints of the real-world person. The body part is further associated with a mesh that defines a three-dimensional outline of a shape of the body part, and the overlay is configured to mask the body part and replace the body part with an animated overlay. In one embodiment, the animated overlay modifies movement of the body part so as to adjust the intensity level exhibited by the real-world person when viewed via the AR glasses. In one embodiment, the AR glasses include a depth camera for capturing depth data used for generating the mesh that defines the three-dimensional outline of the shape of the body part. In one embodiment, the body part is a single body part or a combination of two or more body parts.

In another example embodiment, a method for augmenting a real-world scene viewed through augmented reality (AR) glasses is provided. The method includes determining that an overlay should be processed for a real-world person being viewed via the AR glasses, with the determining using artificial intelligence (AI) to identify a trigger scenario. The artificial intelligence (AI) is configured to process a video stream of images captured of the real-world person using a camera of the AR glasses to identify the trigger scenario, with the trigger scenario being associated with an intensity level exhibited by the real-world person. The method also includes identifying the overlay to replace a portion of a body part of the real-world person in the video stream of images, with the body part being associated with a rig of joints of the real-world person, and the body part being further associated with a mesh that defines a three-dimension outline of a shape of the body part. The overlay is configured to mask the body part and replace the body part. The method further includes generating an augmented video stream that includes the video stream composited with the overlay. The augmented video stream being presented via the AR glasses is configured to adjust the intensity level exhibited by the real-world person when viewed via the AR glasses.

In one embodiment, the overlay is an animated overlay that modifies movement of the body part so as to adjust the intensity level exhibited by the real-world person when viewed via the AR glasses. In one embodiment, the animated overlay adjusts the intensity level exhibited by the real-world person when viewed via the AR glasses by adjusting an amplitude of the movement of the body part. In one embodiment, the animated overlay adjusts the intensity level exhibited by the real-world person when viewed via the AR glasses by adjusting a frequency of the movement of the body part. In one embodiment, the animated overlay adjusts the intensity level exhibited by the real-world person when viewed via the AR glasses by adjusting an amplitude of the movement of the body part and adjusting a frequency of the movement of the body part. In one embodiment, the animated overlay adjusts the intensity level exhibited by the real-world person when viewed via the AR glasses by reducing an amplitude of the movement of the body part and reducing a frequency of the movement of the body part.

In yet another example embodiment, a non-transitory computer readable medium containing program instructions for augmenting a real-world scene viewed through augmented reality (AR) glasses is provided. The execution of the program instructions by one or more processors of a computer system causes the one or more processors to carry out operations of a method for augmenting a real-world scene viewed through AR glasses. The method operations include determining that an overlay should be processed for a real-world person being viewed via the AR glasses, with the determining using artificial intelligence (AI) to identify a trigger scenario. The AI is configured to process a video stream of images captured of the real-world person using a camera of the AR glasses to identify the trigger scenario, with the trigger scenario being associated with an intensity level exhibited by the real-world person. The method also includes identifying the overlay to replace a portion of the real-world person in the video stream of images, and generating an augmented video stream that includes the video stream composited with the overlay. The augmented video stream being presented via the AR glasses is configured to adjust the intensity level exhibited by the real-world person when viewed via the AR glasses.

Other aspects and advantages of the disclosures herein will become apparent from the following detailed description, taken in conjunction with the accompanying drawings, which illustrate by way of example the principles of the disclosures.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Embodiments of the present invention provide a method for augmenting a real-world scene viewed through augmented reality (AR) glasses or other wearable display in which live video images are dynamically modified using overlays that block and replace parts of the live video images. The live video images captured by a camera of the AR glasses are analyzed using machine learning to determine whether scenarios specified in a user's profile are present in the images. If a scenario that the user does not want to see or a scenario that the user wants to be enhanced is determined to be present, the machine learning will trigger an overlay generator to generate overlay images which will be combined with the live video images. In this manner, the user wearing the AR glasses will not be exposed to visual and/or audio content from the real world that might be detrimental to the user's well-being, e.g., due to a medical condition, or the user can have visual and/or audio content that the user might fail to appreciate in real time enhanced so that the user does not miss out on such content. The video being presented to a user wearing AR glasses includes overlays that cover up and replace visual images with modified or augmented visual images in a seamless manner that is perceived by the user to be an actual real-world view of a scene.

Figure 1A:
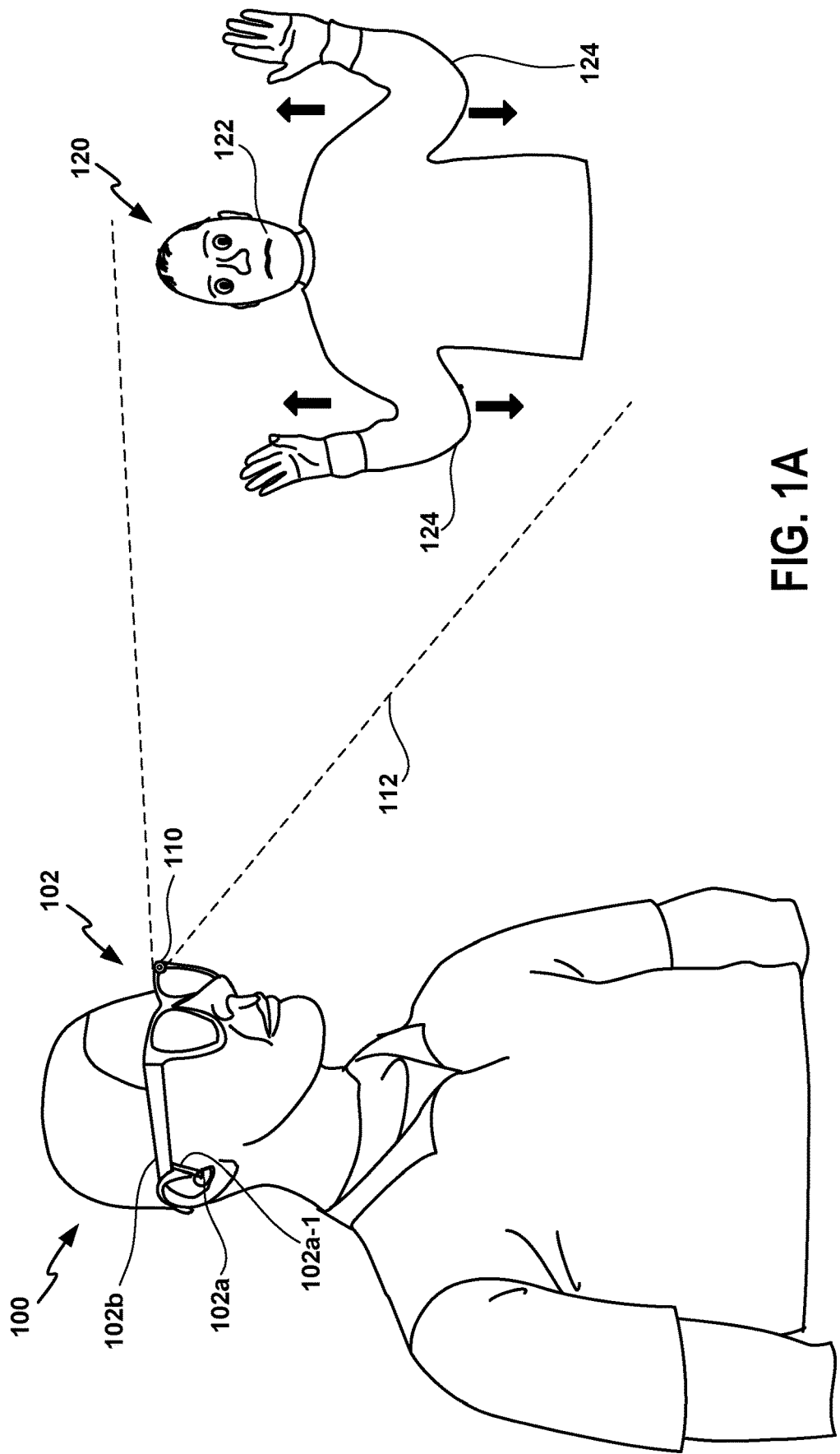
FIG. 1A is a simplified illustration that shows a user wearing a pair of augmented reality (AR) glasses, in accordance with one embodiment.

FIG. 1A is a simplified illustration that shows a user wearing a pair of augmented reality (AR) glasses, in accordance with one embodiment. As shown in FIG. 1A, user 100 is wearing a pair of augmented reality (AR) glasses 102. In one embodiment, the AR glasses 102 are configured so that the AR glasses can be worn in the same manner that standard, e.g., prescription, eyeglasses are worn. The AR glasses 102 are configured to connect to the Internet, as described in more detail below with reference to FIG. 1C. The AR glasses 102 also include two earpieces 102a which enable the user 100 to receive audio input in each ear. In one embodiment, the earpieces 102a are earbuds each of which is connected by a wire 102a-1 to one of the temples (arms) 102b of the AR glasses 102. In another embodiment, the earpieces 102a are earbuds that are wirelessly connected, e.g., via Bluetooth, to the AR glasses 102. Those skilled in the art will appreciate that other audio input devices, e.g., headphones, also can be used with the AR glasses 102 to enable the user 100 receive audio input.

The AR glasses 102 also include at least one camera 110. In one embodiment, the camera 110 is a forward-facing camera with a field of view (FOV) 112 that is directed away from the user 100. In one embodiment, the camera 110 is a standard RGB (red, green, blue) camera, which provides two-dimensional images as a grid of pixels with associated RGB (red, green, blue) values, and/or a depth camera, which provide images that include pixels having an additional numerical value associated with them, with that additional value being the distance from the camera, or "depth." As shown in FIG. 1A, real-world subject 120 is within the field of view (FOV) 112 of camera 110. The subject 120 has an angry face 122 and the subject is rapidly moving their arms 124 up and down. The angry face 122 of the subject 120 is characterized by bulging eyes and lips that are firmly pressed together.

Figure 1B:
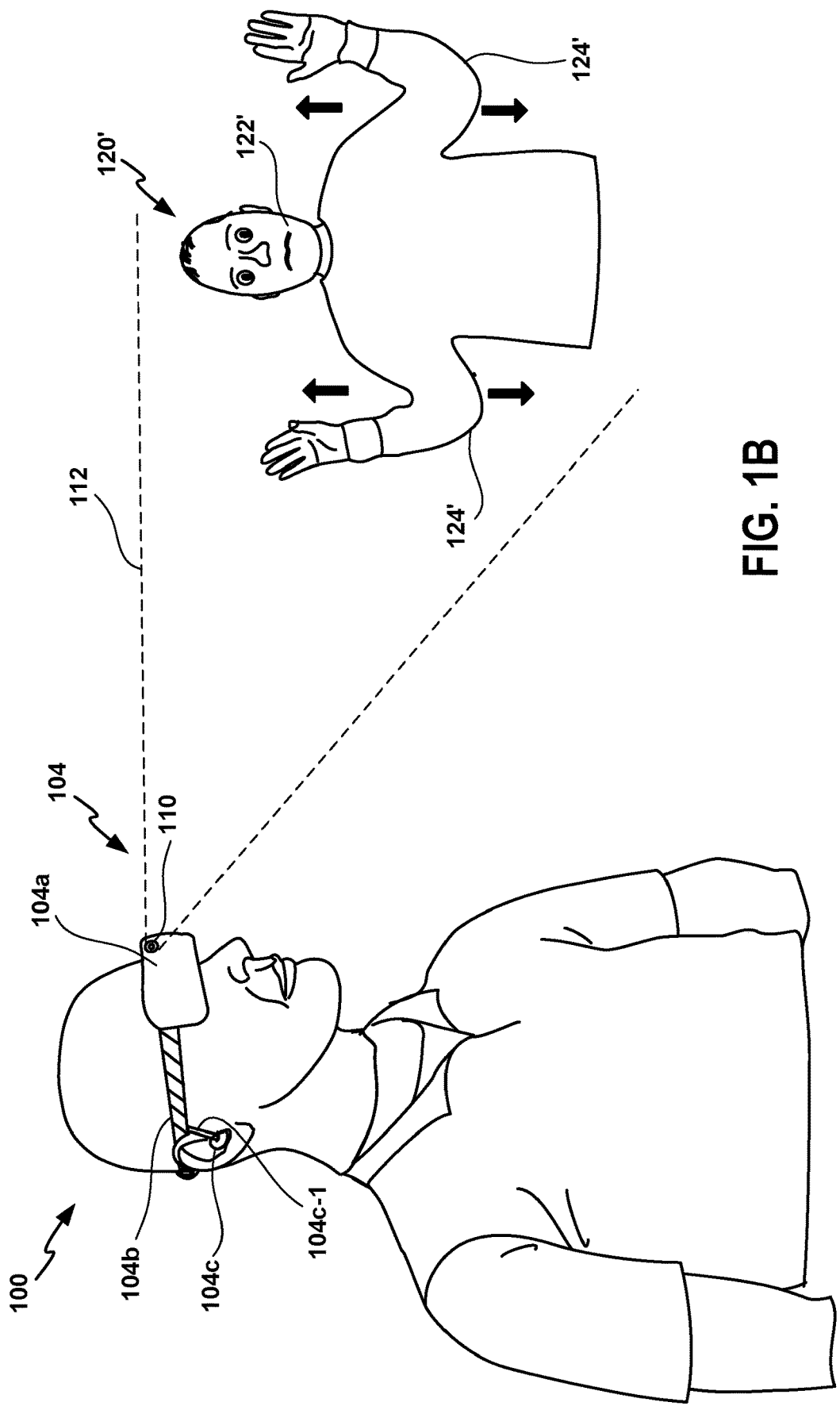
FIG. 1B is a simplified illustration that shows a user wearing a head-mounted display (HMD), in accordance with one embodiment.

FIG. 1B is a simplified illustration that shows a user wearing a head-mounted display (HMD), in accordance with one embodiment. As shown in FIG. 1B, user 100 is wearing a head-mounted display (HMD) 104. In one embodiment, the HMD 104 includes a visor 104a and a strap 104b for supporting the visor on the user's head. The visor 104a displays video images to the user 100. In the case where the visor 104a displays video images from a virtual world, e.g., a video game or a movie, the HMD 104 functions as a virtual reality (VR) device. The visor 104a includes at least one front-facing camera 110 which enables the visor to display video images of the real world to the user 100. In one embodiment, the front-facing camera 110 is a standard RGB camera and/or a depth camera. As described in more detail below, the video images of the real world captured by the front-facing camera 110 can be augmented for display by the visor 104a. In the case where the visor 104a displays augmented video images from the real world, the HMD 104 functions as an augmented reality (AR) device. As shown in FIG. 1B, real-world subject 120' is within the field of view (FOV) 112 of camera 110. The subject 120' has an angry face 122' and the subject is rapidly moving their arms 124' up and down. The angry face 122' of the subject 120' is characterized by bulging eyes and lips that are firmly pressed together.

The HMD 104 is configured to connect to the Internet, as will be described in more detail below with reference to FIG. 1C. The HMD 104 also includes earpieces 104c which enable the user 100 to receive audio input. In one embodiment, the earpieces 104c are earbuds that are connected by a wire 104c-1 to strap 104b of the HMD 104. In another embodiment, the earpieces 104c are earbuds that are wirelessly connected, e.g., via Bluetooth, to the HMD 104. Those skilled in the art will appreciate that other audio input devices, e.g., headphones, also can be used with the HMD 104 to enable the user 100 receive audio input.

Figure 1C:
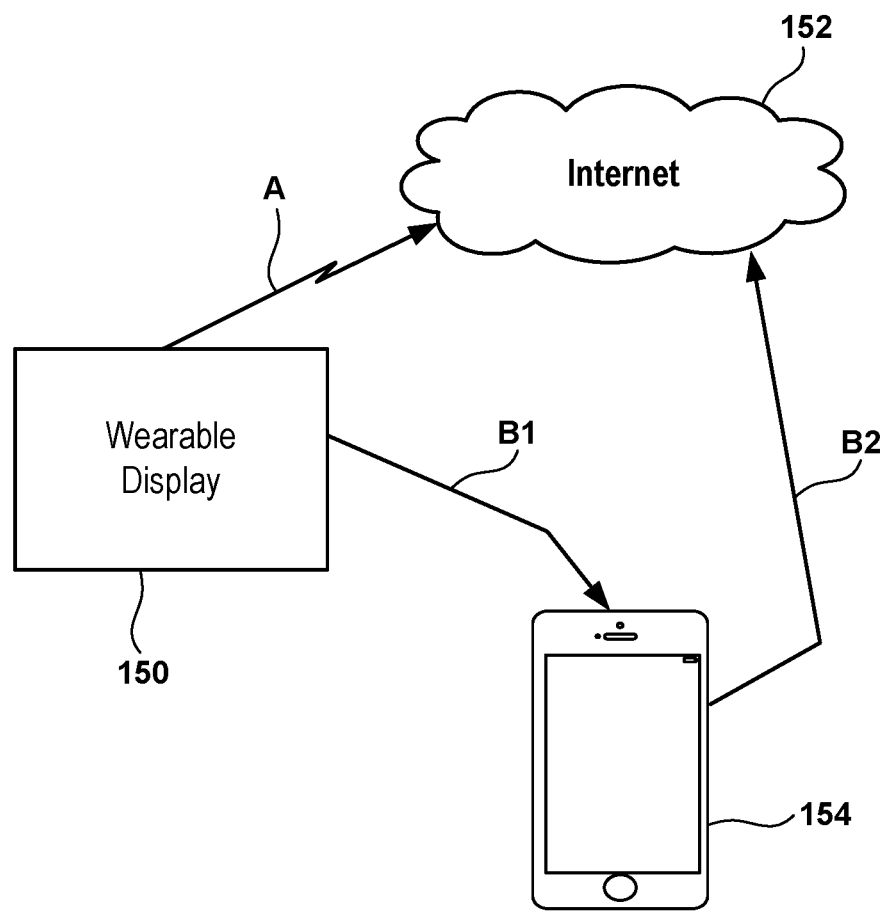
FIG. 1C is a simplified schematic diagram that illustrates how a wearable display can be connected to the Internet, in accordance with one embodiment.

FIG. 1C is a simplified schematic diagram that illustrates how a wearable display can be connected to the Internet, in accordance with one embodiment. As shown in FIG. 1C, wearable display 150 can be either directly or indirectly connected to the Internet 152. In one embodiment, wearable display 150 is a pair of AR glasses, e.g., AR glasses 102 shown in FIG. 1A. In another embodiment, wearable display 150 is an HMD, e.g., HMD 104 shown in FIG. 1B. As indicated by the arrow labeled A in FIG. 1C, the wearable display 150 can be directly connected to the Internet 152. In one embodiment, the wearable display is directly connected to the Internet 152 using a wireless network connection, e.g., Wi-Fi, or a cellular network connection, e.g., a 4G network, a 5G network, etc. As indicated by the arrows labeled B1 and B2 in FIG. 1C, the wearable display 150 can be indirectly connected to the Internet 152 by first connecting the wearable display to smartphone 154 (see the arrow labeled B1 in FIG. 1C) and then using the smartphone's connection to the Internet (see the arrow labeled B2 in FIG. 1C). In one embodiment, the connection between the wearable display 150 and the smartphone 154 is implemented using a suitable wireless communication protocol, e.g., Bluetooth. In one embodiment, the smartphone 154 is connected to the Internet 152 using a wireless network connection, e.g., Wi-Fi, or a cellular network connection, e.g., a 4G network, a 5G network, etc.

Figure 2:
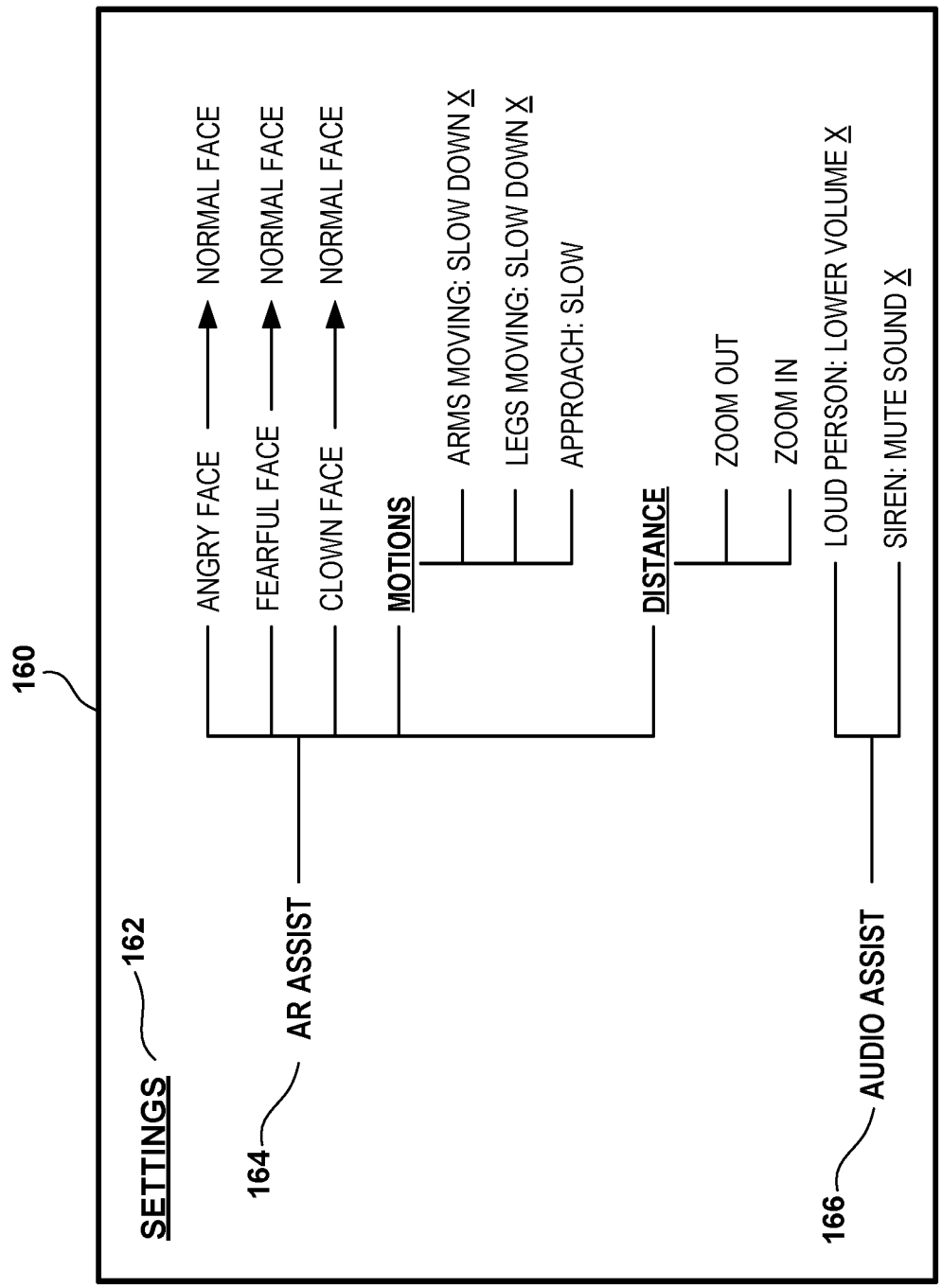
FIG. 2 illustrates an example user interface that can be used to adjust the settings for a profile of the user, in accordance with one embodiment.

FIG. 2 illustrates an example user interface that can be used to adjust the settings for a profile of the user, in accordance with one embodiment. As shown in FIG. 2, user interface 160 includes settings 162 which can be adjusted to select an appropriate profile for a user. The settings 162 include settings for AR assist 164 and settings for audio assist 166. The settings for AR assist 164 can be used to select scenarios which will be adjusted for the user using AR overlays, as described in more detail below. For example, if a user, e.g., a user with autism, does not like seeing angry faces on people, the user can select that an "angry face" be replaced with a "normal face." In one embodiment, an image captured of a scene being viewed by the user is determined to include an "angry face" if a face of a person in the scene has one or more of the following features: lowered brows; bulging eyes; and lips pressed together firmly. In one embodiment, the "angry face" is transformed into a "normal face" using AR overlays to replace the above-listed features with normal brows, normal-sized eyes, and lips configured such that the corners of the mouth are raised upwardly, e.g., to define a smile.

If the user does not like seeing fearful faces on people, the user can select that a "fearful face" be replaced with a "normal face." In one embodiment, an image captured of a scene being viewed by the user is determined to include a "fearful face" if a face of a person in the scene has one or more of the following features: raised brows; eyes open wider than normal; and a slightly open mouth. In one embodiment, the "fearful face" is transformed into a "normal face" using AR overlays to replace the above-listed features with normal brows, eyes open a normal amount, and lips configured such that the corners of the mouth are raised upwardly, e.g., to define a smile.

If the user does not like seeing a person dressed as a clown, the user can select that a "clown face" be replaced with a "normal face." In one embodiment, an image captured of a scene being viewed by the user is determined to include a "clown face" if a face of a person in the scene has one or more of the following features: white face makeup; red nose; exaggerated eyes created with dark makeup; and an exaggerated smile created with red makeup. In one embodiment, the "clown face" is transformed into a "normal face" using AR overlays to replace the above-listed features with a normal (skin-colored) face without white makeup, a normal (skin-colored) nose, normal eye regions without dark makeup, and a normal mouth area without red makeup. Additionally, if the person dressed as a clown has a clown hairstyle, e.g., rainbow-colored hair, bright orange hair, etc., then an AR overlay can be used to replace the clown hairstyle with a more customary hairstyle, e.g., combed black hair, combed blond hair, short black hair, short blond hair, etc.

In addition to facial features, the AR overlays also can be used to replace body parts, as described in more detail below. For example, if a user does not like seeing a person that is frantically waving their arms or a person that is repeatedly moving their legs, the user can select that the moving arms or moving legs be slowed down for viewing by the user. In particular, as shown in FIG. 2 under the heading "Motions," the user can select "slow down" for one or both of "arms moving" and "legs moving." In one embodiment, the motion of the person's arms is slowed down by replacing portions of the person's arms in a video stream with animated overlays that are moving at a slower rate. In one embodiment, the motion of the person's legs is slowed down by replacing portions of the person's legs in a video stream with animated overlays that are moving at a slower rate.

If a user does not like being rapidly approached by a person, the user can select that the person's approach to the user be slowed down for viewing by the user. In one embodiment, the person's approach to the user is slowed down by replacing the viewable portion of the person's body in a video stream with an animated overlay that is moving at a slower rate. Further, if the user does not like being closely surrounded by people, the user can select the "zoom out" setting for viewing the people in a scene. In one embodiment, the video stream of the people in a scene being viewed by the user is zoomed out so that the people in the scene appear to be farther away from the user. On the other hand, if the user prefers to be closely surrounded by people, the user can select the "zoom in" setting for viewing the people in a scene. In one embodiment, the video stream of the people in a scene being viewed by the user is zoomed in so that the people in the scene appear to be closer to the user.

With continuing reference to FIG. 2, settings 162 also include settings for audio assist 166. The settings for audio assist 166 enable a user to select scenarios in which the audio portion of a scene being viewed by the user will be adjusted in accordance with the user's preferences. By way of example, if the user does not like listening to people who are loud, the user can select the "lower volume" option for scenes which include a person talking loudly or otherwise making loud noises. In one embodiment, as the user views the video stream of the scene, the volume of the audio portion of the scene being transmitted to the user via the earpieces of the wearable display, e.g., earpieces 102a of AR glasses 102 or earpieces 104c of HMD 104, will be reduced to the degree required for the loud person to appear to be talking in a normal tone or making noises at a reasonable decibel level. In another example, if the user does not like hearing loud noises such as sirens, the user can select the "mute sound" option for scenes which include a siren or other loud noise. In one embodiment, as the user views the video stream of the scene, noise cancellation techniques are used to remove the siren or other loud noise from the audio portion of the scene being transmitted to the user via the earpieces of the wearable display. In one embodiment, headphones can be used with the wearable display instead of earpieces to increase the effectiveness of the noise cancellation process.

Figures 3A, 3B:
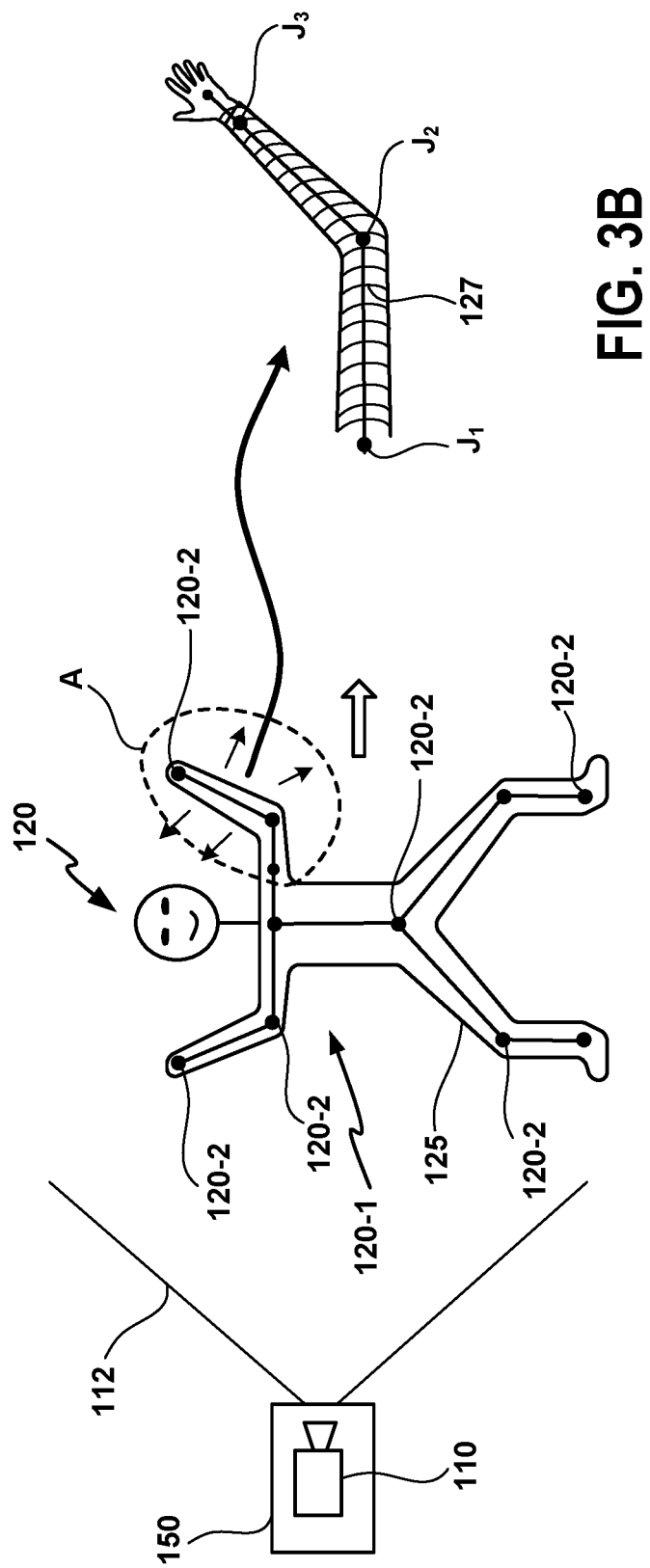
FIG. 3A illustrates a scenario in which an image of a scene has been captured by the camera of a wearable display and machine learning is used to identify a body part of a subject in the scene that needs to be replaced with an overlay, in accordance with one embodiment.
FIG. 3B shows an example of an arm of a subject that has been modeled using a 3D mesh, in accordance with one embodiment.

FIG. 3A illustrates a scenario in which an image of a scene has been captured by the camera of a wearable display and machine learning is used to identify a body part of a subject in the scene that needs to be replaced with an overlay, in accordance with one embodiment. As shown in FIG. 3A, camera 110 of wearable display 150 has captured an image of a scene including user 120 in the camera's field of view (FOV) 112. As part of the overlay processing, the image data has been analyzed and this analysis of the image data has determined that subject 120 includes a body 120-1 with a plurality of joints 120-2. In one embodiment, the image data is analyzed by either the overlay logic or by separate rigging logic. To identify and track the body 120-1 and joints 120-2, a skeletal rig 125 and three-dimensional (3D) mesh 127 (see FIG. 3B) are generated for the body. The skeletal rig 125 provides an outline of the body 120-1 and the joints and the three-dimensional (3D) mesh 127 provides an approximate depth, shape, and contours of the body or parts of the body. Thus, to generate the 3D mesh 127, in one embodiment, the camera 110 is a depth camera. Alternatively, two RGB cameras can be used to capture the image depth data needed to generate the 3D mesh 127. In other embodiments, a combined depth camera and an RGB camera can be used to capture the parameters needed for generating the 3D mesh or for accessing templates of the 3D mesh so all 3D meshing can be processed more quickly and/or with less processing resources.

As shown in FIG. 3A, the subject 120 is moving their left arm, which is encircled by the dashed line labeled "A," back and forth at a relatively rapid rate. The intensity level of the motion of the left arm is sufficient to cause machine learning to identify the motion as a trigger scenario and to determine that an overlay should be used to replace the left arm of the subject 120. FIG. 3B shows an example of the left arm of subject 120 that has been modeled using a 3D mesh. As shown in FIG. 3B, the arm includes joints $J_1$ (the shoulder joint), $J_2$ (the elbow joint), and $J_3$ (the wrist joint) and the 3D mesh 127. The model of the arm, once generated with the 3D mesh 127 and textured with colors to resemble the original arm (and any clothing thereon), can be dynamically moved using animation logic. The animation logic can move the model of the arm in a way that reduces the speed of the motion and thereby lowers the intensity level of the arm motion, as described in more detail with reference to FIGS. 3C and 3D.

Figure 3D:
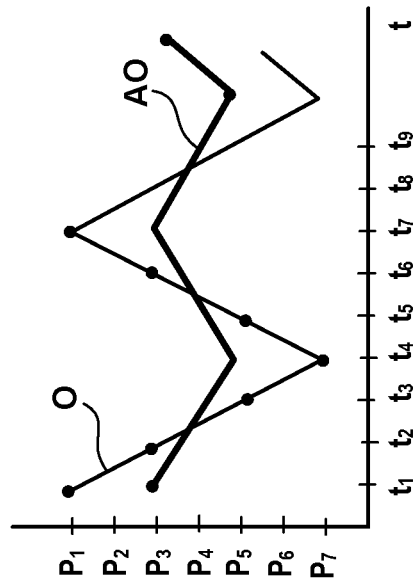
FIG. 3D is a graph that shows motion vs. time for the arm of the subject and the model of the arm that is used to generate an animated overlay that graphically replaces the arm of the subject in an augmented video stream, in accordance with one embodiment.
Figure 3C:
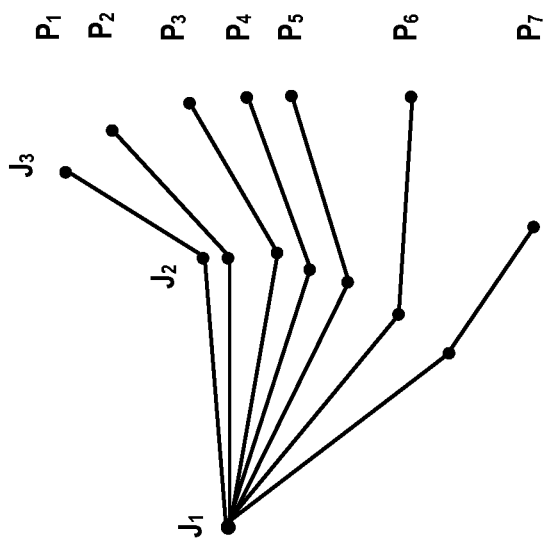
FIG. 3C is a diagram that illustrates an example of the motion of the joints of the subject's arm as the arm is moved up and down.

FIG. 3C is a diagram that illustrates an example of the motion of the joints of the subject's arm as the arm is moved up and down through a range of motion. As shown in FIG. 3C, joint $J_1$ (the shoulder joint) serves as the pivot point for the arm motion and therefore remains in approximately the same position as the arm moves up and down through the range of motion. Joint $J_3$ (the wrist joint) moves from position P1 to position P7 (through positions P2-P6) as the arm moves in the downward direction, and moves from position P7 to position P1 (through positions P6-P2) as the arm moves in the upward direction. Joint $J_2$ (the elbow joint) moves from position P3 to a position just below position P6 as the arm moves in the downward direction (through positions P4-P6), and moves from the position just below position P6 to position P3 (through positions P6-P4) as the arm moves in the upward direction.

FIG. 3D is a graph that shows motion vs. time for the arm of the subject and the model of the arm that is used to generate an animated overlay that graphically replaces the arm of the subject in an augmented video stream, in accordance with one embodiment. As shown in FIG. 3D, the plot line labeled "O" shows the position of joint $J_1$ of the arm of the subject over time. The plot line labeled "AO" shows the position of joint $J_1$ of the model of the arm over time. As can be seen in FIG. 3D, the plot line labeled "O" oscillates between position P1 and position P7 about every 3 time units, e.g., $t_4$-$t_1$, $t_7$-$t_4$, etc. The plot line labeled "AO" oscillated between position P3 and position P5 about every 3 time units, e.g., $t_4$-$t_1$, $t_7$-$t_4$, etc. Thus, the amplitude of the motion of the model of the arm is smaller than the amplitude of the motion of the arm of the subject. As the frequency of the motion of the model of the arm and the motion of the arm of the subject are approximately the same, the speed at which the model of the arm is moving is significantly slower than the speed at which the arm of the subject is moving. Consequently, when an animated overlay generated using the model of the arm is used to replace the arm of the subject in an augmented video stream, the intensity level of the motion of the arm will be decreased.

Figure 4A:
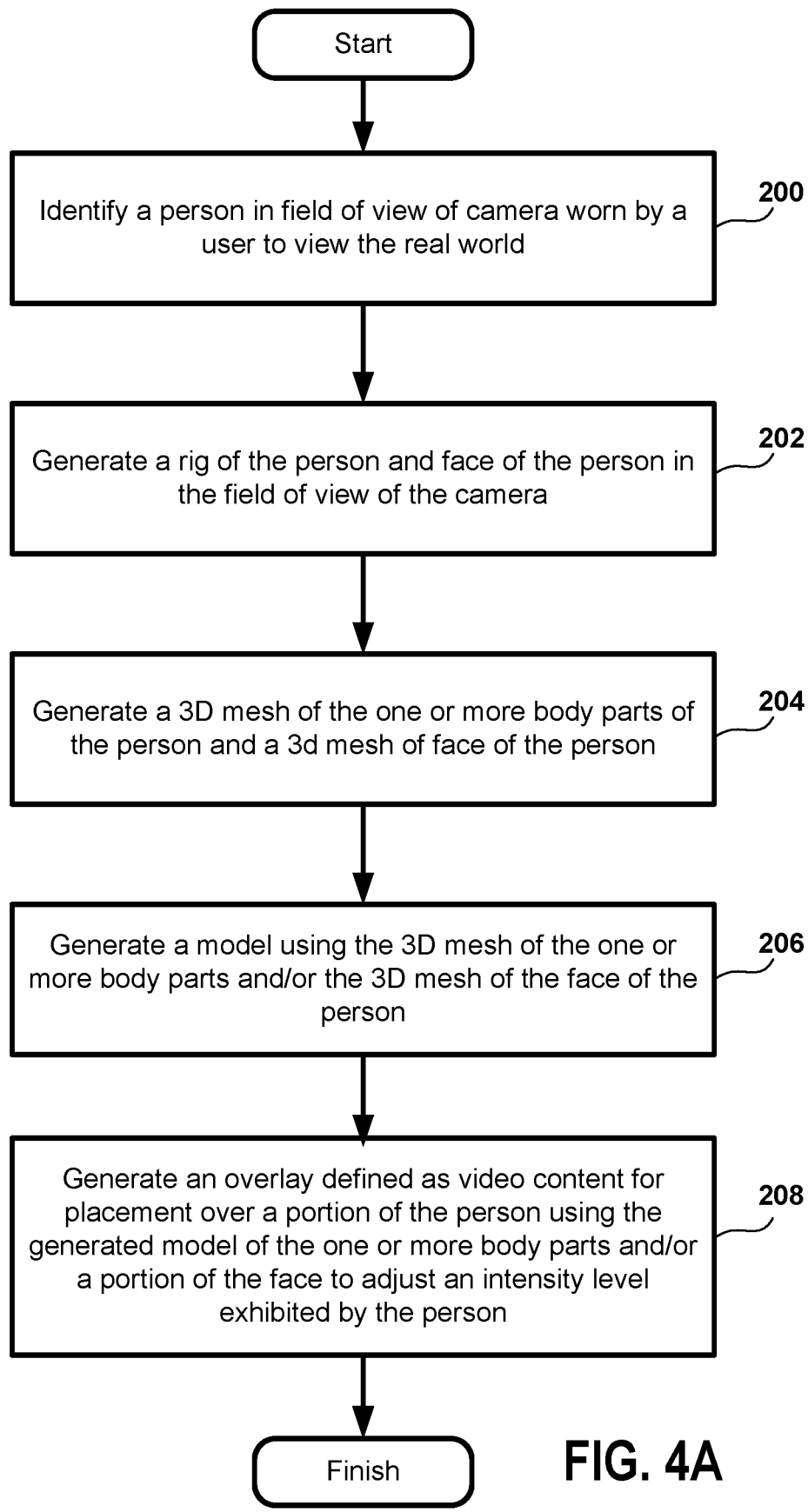
FIG. 4A is a flow diagram illustrating the method operations performed in augmenting a real-world scene viewed through AR glasses, in accordance with an example embodiment.

FIG. 4A is a flow diagram illustrating the method operations performed in augmenting a real-world scene viewed through AR glasses, in accordance with an example embodiment. In operation 200, a person in the field of view (FOV) of a camera worn by a user to view the real world is identified. In one embodiment, the camera is included in the AR glasses (see, e.g., camera 110 in FIG. 1A). To identify a person in the FOV of the camera worn by the user, the image data captured by the camera is processed with suitable image processing software. In one embodiment, the processing is carried out by a smartphone in wireless communication with the AR glasses. In another embodiment, the image data is transmitted to a server for processing and streaming technology is used to transmit the processed image data from the server to the AR glasses for viewing by the user. Once a person has been identified in the FOV of the camera, in operation 202, a rig of the person and a face of the person are generated. In one embodiment, the rig of the person and the face are generated. As described above with reference to FIG. 3A, a skeletal rig is computer generated and provides limb and joints model of a person. In some embodiments, depending on how much of the person is in the FOV, only part of the person's body is rigged and part of the face can be meshed. In some embodiments, machine learning and models of faces and body parts can be used to graphically construct full rigs of bodies even when the entire body is not visible in the FOV. In other embodiments, hybrid models of people can be constructed using part of the image data captured in the FOV of the camera of the AR glasses and part with machine learning and model simulation. With regard to the face mesh construction, multiple facial features, e.g., eyes, brows, mouth, chin, cheeks, etc., can be identified and individually controlled by manipulating the mesh constructed of the face. In one embodiment, modeling software can be used to adjust the vertices of the mesh to change facial feature expression. By way of example, blend shapes can be used to modify the facial features to form one or more facial expressions.

In operation 204, a 3D mesh of one or more body parts of the person and a 3D mesh of the face of the person are generated. As described above with reference to FIG. 3B, the 3D mesh provides an approximate depth, shape, and contours of either the body or parts of the body. In one embodiment, a combined depth camera and an RGB camera can be used to capture the parameters needed for generating the 3D mesh or for accessing templates of the 3D mesh so all 3D meshing can be processed more quickly and/or with less processing resources. In other embodiments, the camera can be a depth camera or two RGB cameras can be used to capture the image depth data needed to generate the 3D mesh. In operation 206, a model is generated using the 3D mesh of the one or more body parts and/or the 3D mesh of the face of the person. In one embodiment, the model is defined by a 3D mesh, points called vertices that define a shape of the object, and texturing (e.g., flesh, clothes, hair, etc.). The vertices form polygons, with a polygon being an area formed from at least three vertices, e.g., a triangle.

In operation 208, an overlay is generated, with the overlay defined as video content for placement over a portion of the person using the generated model of the one or more body parts and/or a portion of the face to adjust an intensity level exhibited by the person. In one embodiment, animation software uses the model and manipulates the model to achieve the desired result. By way of example, in the case of a user profile which indicates that the user does not like seeing a person that is frantically waving their arms, the motion of the person's arms can slowed down by replacing portions of the person's arms in a video stream with animated overlays that are moving at a slower rate. In this manner, the intensity level exhibited by the person, e.g., the rate at which the person is waving their arms, is decreased in the augmented video stream in accordance with the user's profile.

Figure 4B:
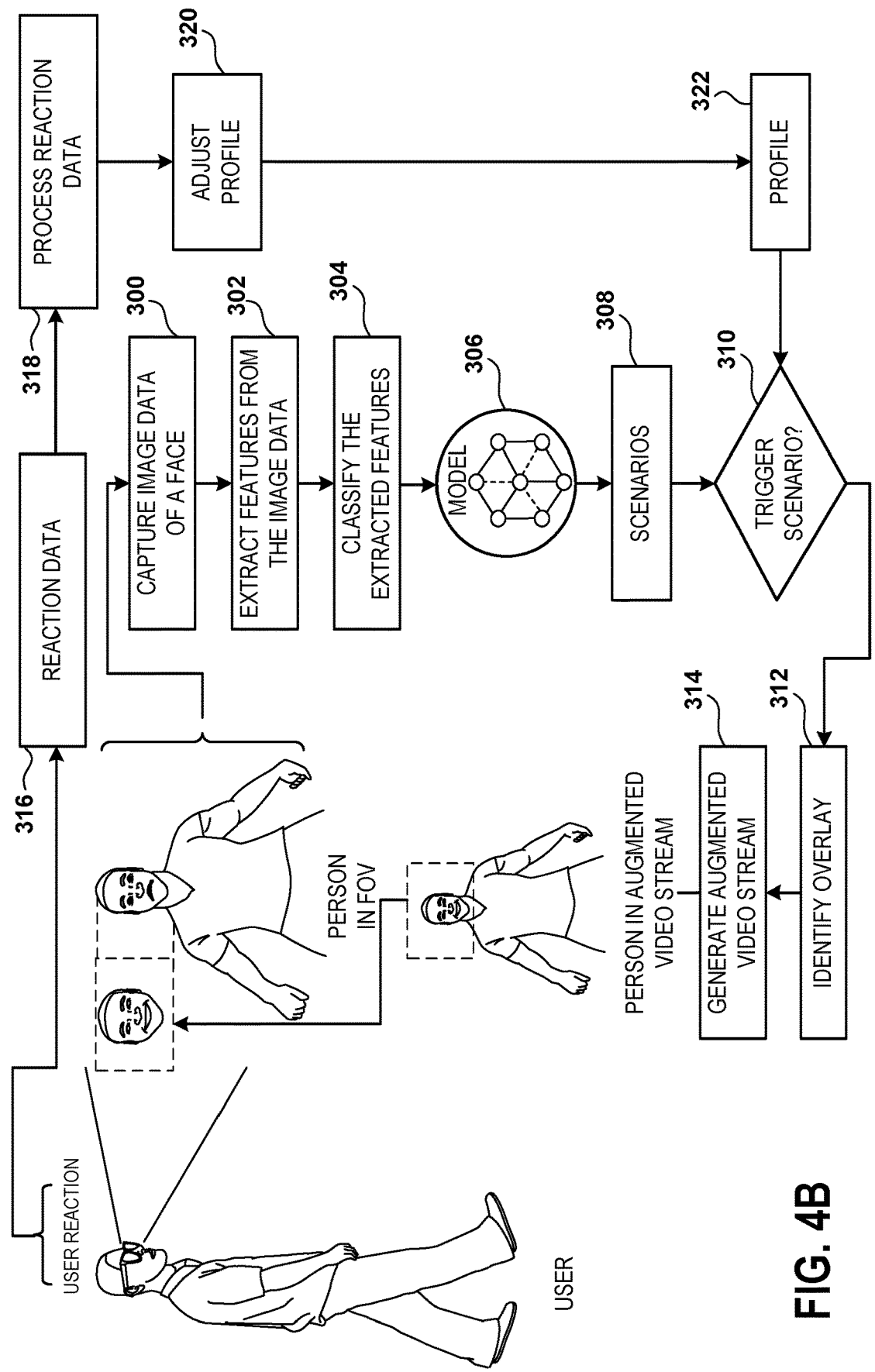
FIG. 4B is a process flow diagram that illustrates the generation of an augmented video stream that includes an overlay of a person's face, in accordance with an example embodiment.

FIG. 4B is a process flow diagram that illustrates the generation of an augmented video stream that includes an overlay of a person's face, in accordance with an example embodiment. In operation 300, image data of a face of a person is captured. In one embodiment, the image data is captured by a camera of AR glasses being worn by the user, and the person (or a part of the person) is in the FOV of the camera (see the "user" and the "person in FOV" on the left side of the figure). In operation 302, the captured image data is processed to extract features from the image data. It should be understood that the image data being captured is a stream of image frames from, e.g., a video, and the processing is using data from multiple frames to capture and track movement of the person, including changes in facial expression, while the person is in the FOV. In one embodiment, a 3D mesh of the face is generated and features of the face are identified in the image data and/or the 3D mesh. By way of example, the features of the face can include the eyes, eyebrows (brows), lips, mouth, chin, cheeks, nose, etc. In operation 304, the extracted features are classified for subsequent use, e.g., use by a model. In one embodiment, the classification processing translates the extracted features into data that can be understood by the model.

In operation 306, the model is used to analyze the data generated by the classification processing to determine whether the extracted features have meaning in the context of a scenario. For example, the scenario may be identified based on actions, motions, and/or expressions made by the person being viewed in the FOV. A scenario, for example, may identify that the person is angry by one or more of a combination of facial expressions or body motions. In one embodiment, the modeling software analyzes the data using machine learning, which learns continuously, as well as learning from earlier training carried out to enable the model to identify an array of scenarios. As a further example, if the data provided to the model is a set of features that includes lowered brows, bulging eyes, and lips pressed firmly together, the model will determine whether this set of features identifies a scenario that the model recognizes. In this example, in operation 308, the model would likely identify a scenario in which the person is acting mean toward the user based on the set of features defining an "angry face." In addition to identifying a scenario based on a set of features, the model also assigns a magnitude to the scenario. In one embodiment, the magnitude is a value that indicates an intensity level of the scenario based on the set of features. In the case of the example of the person with the "angry face" acting mean toward the user, the magnitude would be relatively low, e.g., a 3 on a scale of 10, if it is determined that the person appears to be only mildly perturbed at the user. On the other hand, the magnitude would be relatively high, e.g., an 8 on a scale of 10, if it is determined that the person appears to be highly upset with the user.

In decision operation 310, a decision is made as to whether the scenario at hand is a trigger scenario. In one embodiment, the decision is based on the settings in a user profile. By way of example, if the settings in a user profile indicate that the user does not want to see any people who are acting mean toward to the user at an intensity of level of 6 or higher (on a scale of 10), then a mildly perturbed person acting mean toward the user at a magnitude of 3 (on a scale of 10) would not give rise to a trigger scenario. On the other hand, a highly upset person acting mean toward the user at a magnitude of 8 (on a scale of 10) would give rise to a trigger scenario because the magnitude of 8 exceeds the threshold intensity level of 6 set forth in the settings of the user's profile.

In the event a trigger scenario arises, in operation 312, an overlay is identified for use in an augmented video stream that will be displayed to the user. In a case in which a facial expression needs to be modified for display to the user, in one embodiment, the 3D mesh of the face is accessed and the vertices of the mesh are adjusted to make a different facial expression. By way of example, the 3D mesh can be modified to change an "angry face," e.g., a face with a frown, to a "happy face," e.g., a face with a smile. In one embodiment, the "angry face" is transformed into a "happy face" using overlays to replace lowered brows with normal brows, to replace bulging eyes with normal-sized eyes, and to replace lips pressed firmly together with lips configured such that the corners of the mouth are raised upwardly, e.g., to define a smile. In one embodiment, the modification of the mesh and the vertices can be done using blend shapes software, where a defined program identifies an amount or degree by which the vertices are adjusted to change the facial expression. In some cases, blend shape processing can use templates to make the adjustments less processing intensive and allow for real-time processing needed to substantially instantly produce an overlay that blocks the real world view of the person or face in the FOV and replace it in a seamless, integrated format that blends the graphics for a realistic appearance. In operation 314, the overlays are incorporated into the video stream to generate an augmented video stream, which will be sent to the AR glasses for display to the user. Thus, the user looking at the person in the FOV of the camera of the AR glasses will see a person with a "happy face" instead of an "angry face." More particularly, as can be seen on the left side of FIG. 4B, the user looking at the person in the FOV of the camera of the AR glasses will see the "person in augmented video stream" shown in dashed lines with the "happy face" rather than the "person in FOV" with the "angry face."

In one embodiment, the user's profile is updated based on the user's reaction to scenarios that the user encounters. In operation 316, user reactions are collected as reaction data. By way of example, the user reactions can include sounds made by the user as the user is experiencing the real world through the AR glasses. In one embodiment, the sounds made by the user are captured by a microphone of the AR glasses. The reaction data can also be measurements of inertial sensors on the AR glasses being worn by the user, and/or biometrics measured of the user. By way of example, the biometrics can include heart rate changes and eye tracking analysis (e.g., pupil size) for measuring levels of stimuli or excitement. In some embodiments, the reaction data can be computed based on multiple sensed inputs including, for example, audio input (sounds), biometrics input, inertial sensor input, and input from other sensors. In still other embodiments, the reaction data can be approximated or predicted using machine learning that learns behavior of the user and is trained using historically sensed inputs and associated reactions.

In operation 318, the reaction data is processed to determine how the user is reacting to whatever the user is seeing through the AR glasses. By way of example, the processing of the reaction data can determine whether the user is happy (e.g., laughing), sad (e.g., crying), or upset (e.g., complaining loudly). In operation 320, any adjustments to the user's profile necessitated by the reaction data received from the user are made. In one embodiment, logic for adjusting the user profile changes the values for the settings in the user profile to bring the values in line with the reaction data received from the user. For example, if the reaction data indicates that the user currently gets upset only when experiencing people who are acting mean toward the user at an intensity level of at least 8 (on a scale of 10), the settings in the user's profile can be adjusted in light of this development. In particular, if the settings in the user's profile indicate that the user does not want to see any people who are acting meant toward the user at an intensity level of 6 or higher (on a scale of 10), then the value for this setting can be dynamically increased to an intensity level of 8 or higher because the reaction data indicates that the user is no longer as bothered by people who are acting mean to the user.

In operation 322, the values for the settings in the user profile are updated. In one embodiment, the values for the settings in the user's profile are compiled in a table and the logic for adjusting the user profile dynamically updates the values for the applicable settings in the table when changes are made based on the reaction data. The updated values for the settings in the user profile can then be used in connection with decision operation 310 in which a decision is made as to whether the scenario at hand is a trigger scenario. In the example described above in which the value of the setting in the user's profile is dynamically increased from 6 to 8 (on a scale of 10), a scenario in which the user encountered a person acting mean toward the user at an intensity level having a magnitude of 7 would no longer give rise to a trigger scenario because the magnitude of 7 does not exceed the updated threshold intensity level of 8 set forth in the table of values for the settings in the user profile.

In summary, as described herein, a user can view a real-world scene through AR glasses. A camera of the AR glasses captures live video in the FOV of the camera and the AR glasses streams this live video to the user. In one example, the user has a disability, e.g., a medical condition, which makes the user uncomfortable when the user encounters people who are unhappy, mean, aggressive, overly excited, or in some other fairly extreme state of emotion. To address this situation, the user can specify in the user's profile that the user does not want to see, for example, unhappy people, and can provide a level of unhappiness to which the user is unwilling to be exposed. The live video images captured by the camera of the AR glasses are analyzed using machine learning to determine whether scenarios specified in the user's profile are present in the images. If a scenario that the user does not want to see is determined to be present, e.g., an unhappy person is in the FOV of the camera of the AR glasses, the machine learning will trigger an overlay generator to generate overlay images. The overlay images are combined with the live video images using compositing logic so that the overlay images block and replace portions of the live video images. In the example of the unhappy person, the overlay images block and replace parts of the face of the person so that the person is transformed from an unhappy person, e.g., a person with a frowning face, into a happy person, e.g., a person with a smiling face.

Those skilled in the art will appreciate that the processing involved in viewing the live video images and replacing portions of the live video images, as needed, will result in a slight delay of the display of the augmented video stream to the user. To ensure that the augmented video stream has a realistic appearance to the user, this delay should be less than about 500 milliseconds, to prevent people and other real-world objects in the background of the augmented video stream from having a distorted or otherwise unrealistic appearance. In one embodiment, the processing is configured so that the delay is less than about 300 milliseconds. In some cases, the delay may be less than 150 milliseconds. By way of example, when live video is processed either by a processor of the AR glasses or a processor on a portable device wirelessly linked to the AR glasses, e.g., a smartphone, the detection of the scenario requires processing time. During the processing time, the logic described above will need to identify the scene and apply the overlay images to the live video. The actual video provided to the user wearing the AR glasses will be augmented, wherein a part of the face is modified or part of the body is modified of a person in the FOV of the camera of the AR glasses. The processing is configured to be continuous, as the overlay is being applied as video and the overlay needs to change over time as the face of the person changes or the body of the person changes. In some cases, the overlay may be applied at different times, depending upon whether the scenario changes, appears, or disappears.

As mentioned above, the processing to determine what overlay to apply and when to apply the overlay can be processed locally on the AR glasses or on a portable device linked to the AR glasses, e.g., a smartphone. In some cases, the processing can be done on a server of a cloud processing system. If the processing is done in the cloud, the AR glasses will have an Internet link with sufficient bandwidth to enable the transmission of live video to the server, the processing of the live video to apply the overlay, and the transmission of the processed video back to the AR glasses. The delay in cloud processing may be more than the delay in local processing, and in such cases, it is envisioned that the round trip time delay may be less than 500 milliseconds, or less than 300 milliseconds to avoid causing any disorientation of the user of the AR glasses.

Figure 5:
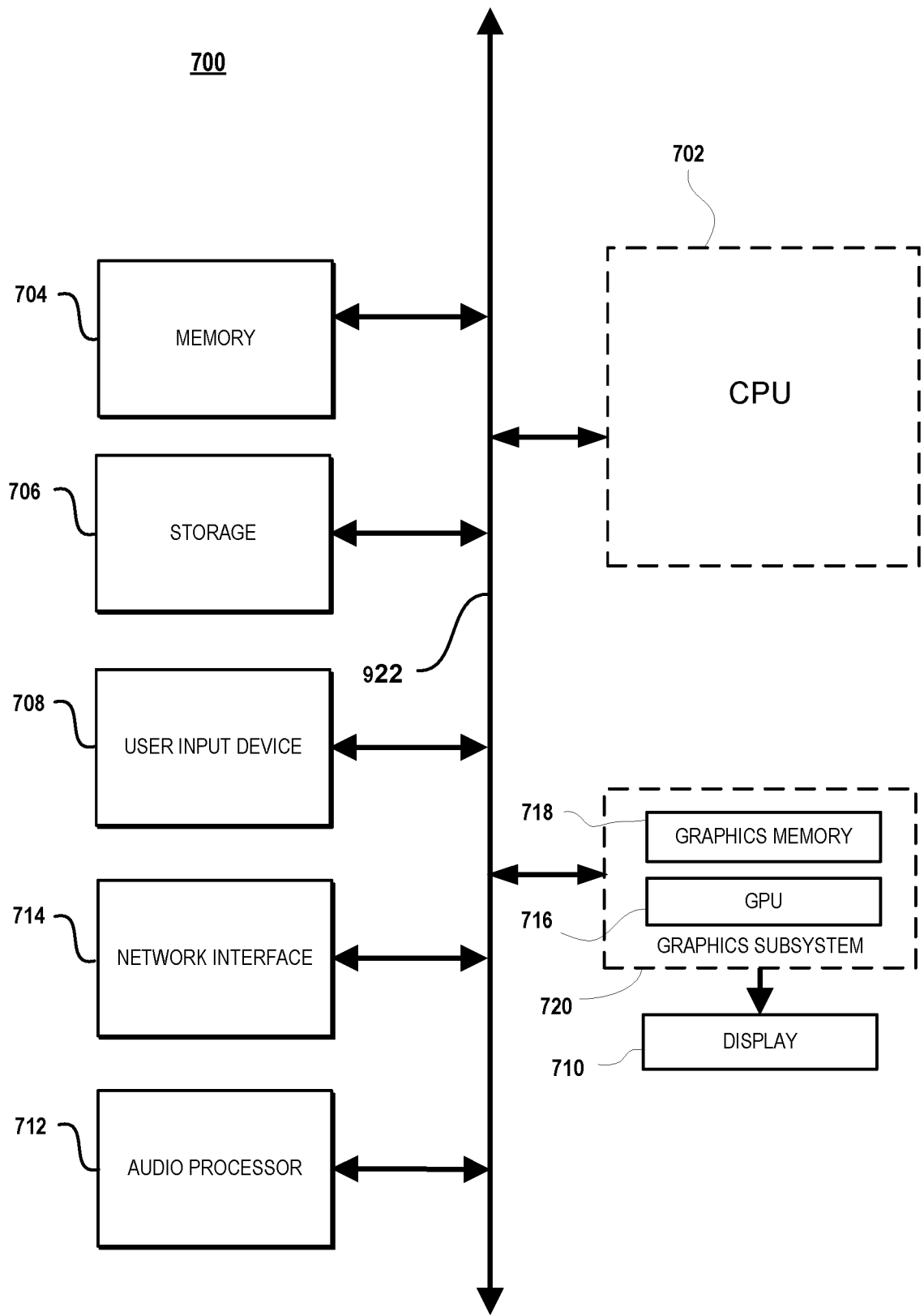
FIG. 5 is a schematic diagram of a computing system and components, which may be used in accordance with one or more embodiments of the disclosure.

FIG. 5 illustrates components of an example device 700 that can be used to perform aspects of the various embodiments of the present disclosure. This block diagram illustrates a device 700 that can incorporate or can be a personal computer, video game console, personal digital assistant, a server or other digital device, suitable for practicing an embodiment of the disclosure. Device 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 700 may be a localized to a player playing a game segment (e.g., game console), or remote from the player (e.g., back-end server processor), or one of many servers using virtualization in a game cloud system for remote streaming of gameplay to clients.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722.

A graphics subsystem 720 is further connected with data bus 722 and the components of the device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 708, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710. Display device 710 can be any device capable of displaying visual information in response to a signal from the device 700, including CRT, LCD, plasma, and OLED displays. Device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Although method operations may be described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Accordingly, the disclosure of the example embodiments is intended to be illustrative, but not limiting, of the scope of the disclosures, which are set forth in the following claims and their equivalents. Although example embodiments of the disclosures have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

What is claimed is:

1. A method for augmenting a real-world scene viewed through augmented reality (AR) glasses, comprising:
    capturing a video stream of images of a real-world person using a camera of the AR glasses;
    determining that an overlay should be processed for an arm or a leg of the real-world person being viewed via the augmented reality (AR) glasses, the determining using artificial intelligence (AI) to identify a trigger scenario associated with the arm or the leg of the real-world person from the video stream of images, the trigger scenario being associated with an intensity level of movement of the arm or leg of the real-world person;
    identifying the overlay to replace the arm or the leg of the real-world person in the video stream of images, the arm or the leg being associated with a rig of joints of the real-world person, and the arm or the leg being further associated with a mesh that defines a three-dimensional outline of a shape of the arm or the leg, the overlay being configured to mask the portion of the arm or the leg and replace the portion of the arm or the portion of the leg, and the overlay that replaces the portion of the arm or the portion of the leg includes animation that changes a range of motion of the movement of the arm or leg of the real-world person when viewed via the AR glasses; and
    generating an augmented video stream that includes the video stream composited with the overlay, the augmented video stream being presented via the AR glasses instead of the video stream of images captured by the camera, the augmented video stream presenting an adjusted intensity level based on said animation to avoid presenting the arm or the leg of the real-world person that is identified to be associated with the trigger scenario via the AR glasses.

2. The method of claim 1, wherein changing the range of motion of the movement of the arm or the leg of the real-world person adjusts the intensity level of the movement of the arm or leg of the real-world person when viewed via the AR glasses.

3. The method of claim 2, wherein the overlay is an animated overlay that adjusts the intensity level of the movement of the arm or leg of the real-world person when viewed via the AR glasses by adjusting an amplitude of the movement of the arm or the leg.

4. The method of claim 2, wherein the overlay is an animated overlay that adjusts the intensity level of the movement of the arm or leg of the real-world person when viewed via the AR glasses by adjusting a frequency of the movement of the arm or the leg.

5. The method of claim 2, wherein the overlay is an animated overlay that adjusts the intensity level of the movement of the arm or the leg of the real-world person when viewed via the AR glasses by adjusting an amplitude of the movement of the arm or the leg and adjusting a frequency of the movement of the arm or the leg.

6. The method of claim 2, wherein the overlay is an animated overlay that adjusts the intensity level of the movement of the arm or the leg of the real-world person when viewed via the AR glasses by reducing an amplitude of the movement of the arm or the leg and reducing a frequency of the movement of the arm or the leg.

* * * * *